United States Patent [19]

Kluksdahl

[11] 4,192,736
[45] Mar. 11, 1980

[54] REMOVAL OF INDIGENOUS METAL IMPURITIES FROM AN OIL WITH PHOSPHORUS OXIDE-PROMOTED ALUMINA

[75] Inventor: Harris E. Kluksdahl, San Rafael, Calif.

[73] Assignee: Chevron Research Company, San Francisco, Calif.

[21] Appl. No.: 964,766

[22] Filed: Nov. 29, 1978

[51] Int. Cl.² ............... C10G 29/16; C10G 23/02
[52] U.S. Cl. .................. 208/251 H; 208/253
[58] Field of Search ............... 208/253, 251 R, 251 H

[56] References Cited

U.S. PATENT DOCUMENTS

| 2,764,525 | 9/1956 | Porter et al. | 208/253 |
| 2,987,470 | 6/1961 | Turken | 208/253 |
| 3,432,442 | 3/1969 | Gleim | 208/253 |
| 3,819,509 | 6/1974 | Wolk et al. | 208/251 H |
| 3,964,995 | 6/1976 | Wolk et al. | 208/251 H |

FOREIGN PATENT DOCUMENTS 729301  5/1955  United Kingdom ............ 208/253

Primary Examiner—George Crasanakis
Attorney, Agent, or Firm—D. A. Newell; R. H. Davies; D. L. Hagmann

[57] ABSTRACT

Indigenous metal impurities in an oil are removed by contacting the oil with a novel solid consisting essentially of porous alumina containing a minor amount of phosphorus. The contacting is carried out under oil demetallizing conditions.

4 Claims, No Drawings

REMOVAL OF INDIGENOUS METAL IMPURITIES FROM AN OIL WITH PHOSPHORUS OXIDE-PROMOTED ALUMINA

BACKGROUND OF THE INVENTION

The invention relates to upgrading oils by effecting removal of trace metal impurities.

It has long been known that various metallic elements are found in naturally occuring and synthetic crude oils (see O. I. Miller et al, Anal. Chem., 24, 1728 [1952]).

Some of these metal impurities are known to be harmful when present in charge stocks for petroleum refining, for example cracking, when present in fuels for boilers and turbines and the like uses.

A process for removing vanadium and sodium from a crude oil is disclosed in U.S. Pat. No. 2,764,525 (F. W. Porter et al) wherein the oil is contacted in the presence of hydrogen with alumina containing a minor amount of ferric oxide.

A method of treating a petroleum oil containing trace metal components is disclosed in U.S. Pat. No. 2,910,434 (H. V. Hess, et al) wherein the oil is contacted with an inert packing material in the presence of hydrogen gas.

In U.S. Pat. No. 2,987,470 (M. Turken) a process is disclosed for demineralizing an oil by contact thereof in an ebullated bed with particulate contact materials, for example bauxite, alumina and the like.

In U.S. Pat. No. 3,819,509 (R. H. Walk et al) metal- and sulfur-containing contaminants in a residual oil are removed from the oil by contacting the oil in the presence of desulfurization catalyst and an intimate admixture of inert demetallization solids.

In U.S. Pat. No. 3,964,995 (R. H. Walk et al) metals are removed from a sulfur- and metals-contaminated oil using porous alumina solids activated with an oxide promoter of the group $Fe_2O_3$, $TiO_2$ and $SiO_2$.

An object of this invention is to provide an improved process for upgrading an oil by removing metal contaminants from the oil using a novel oxide-promoted alumina.

SUMMARY OF THE INVENTION

A process is provided for upgrading an oil selected from the group consisting of petroleum and syncrude oils, fractions and mixtures thereof and the like containing at least a substantial content of at least one metal impurity selected from the group consisting of metal impurities indigenous to said oils, by contact thereof under oil demetallizing conditions with a solid consisting essentially of alumina containing an oxide promoter, the improvement comprising (1) carrying out said upgrading wherein said alumina has a pore volume of at least 0.3 cc per gram and contains, in parts by weight, for each 100 parts of alumina, an amount, calculated as phosphorus, of phosphorus oxide in the range of from about 0.1 to 10 parts; and (2) recovering the resulting oil having, relative to said oil, a substantially reduced content of said impurities.

EMBODIMENT

In a preferred embodiment a petroleum vacuum residuum, for example as obtained from an Iranian crude oil, is demetallized. A typical such feed has a vanadium plus nickel content of about 100 ppmw. It is contacted in a fluid bed contacting zone with an alumina-phosphorus oxide composite under conditions as follows:

| | |
|---|---|
| Temp., °C. | 400 |
| Hydrogen rate, SCM/Kl | 200 |
| Pressure, Atm. gauge | 170 |
| LHSV, V/V/Hr | 1 |

The contacting is carried out in the fluid-bed mode [see for example U.S. Pat. No. 2,987,470 (M. Turken) or U.S. Pat. No. 3,819,509 (R. H. Walk et al)] using a composite sized for conventional fluid bed and containing, in parts by weight and calculated as phosphorus, about 1 part of phosphorus oxide per 100 parts of porous alumina having a pore volume of about 0.6 cc per gram of which at least 50% thereof is in micropores having diameters in the 60 to 250 Angstrom range and 5 to 10% is in macropores having diameters in the range above about 1000 Angstroms (see, for example, U.S. Pat. No. 3,997,476—N. L. Coll—and No. 4,001,144—M. J. Pearson et al). The resulting oil has, relative to the feed, a substantially reduced content of vanadium and nickel, for example, at least a 50% reduction thereof.

In a further embodiment, a residuum feed is demetallized and hydrodesulfurized in a common downflow reactor containing an upper and lower fixed-bed contact mass. In the upper bed is placed the aforedescribed oxide-modified alumina. In the lower bed is placed a conventional hydrocarbon hydrodesulfurizing catalyst, for example as described in U.S. Pat. No. 4,103,822 (P. W. Tamm). The effluent from the upper bed is, of course, the feed to the lower bed. The process conditions in the reactor are those typically maintained in hydrodesulfurizing a sulfur contaminated feed, for example, as follows:

| | |
|---|---|
| Temperature, °C. | 260 to 455 |
| Pressure, Atm. gauge | 14 to 680 |
| LHSV, V/V/Hr | 0.2 to 10 |
| Hydrogen rate, SCM/Kl of feed | 89 to 3600 | wherein process control is mainly by incrementally increasing the temperature as required for feed conversion to a constant sulfur level in the liquid product, for example, at a level in the range 0.1 to 0.5 weight percent.

Demetallizing Conditions

Conditions satisfactory for use herein for demetallizing an oil are, in general, conditions typically employed. The contacting may be carried out either in the presence of added hydrogen gas or without adding hydrogen gas. The former mode usually produces better results in terms of metals removal, which, for practical purposes, should at least be substantial (25%). Representative typical oil-demetallizing conditions suitable for use herein include:

| | |
|---|---|
| Temp., °C. | 260 to 455 |
| Pressure, Atm. gauge | 14 to 680 |
| LHSV, V/V/Hr (or equivalent) | 0.2 to 10 |
| Hydrogen Rate, SCM/KL of feed | 0 to 3600 |

Feeds

Hydrocarbonaceous oils containing at least a substantial (10 ppmw) content of indigenous metal impurities as suitable for use as feeds herein. Representative feeds include petroleum and syncrude (shale, tar sand and the like oils) oils, fractions and mixtures thereof having at least a substantial content of at least one indigenous metal impurity. Petroleum residua are preferred feedstocks as well as such containing added recycled oil, such as cutter stock, heavy gas oil, and the like oils.

Oxide-Modified Alumina

The alumina required herein may be prepared by any suitable method, including (1) pore-fill impregnation of commercially available alumina with a suitable solution of phosphoric acid or salt thereof decomposable to phosphorus oxide; (2) comulling powdered alumina and phosphorus pentoxide and shaping (e.g., extruding), drying and calcining the shaped particles; (3) preparing a cogel of alumina and silica and a stabilizing amount (1-5 weight percent) of the latter followed by (a) the addition of an oxyacid of phosphorus, a salt thereof which dissociates to phosphorus oxide or phosphorus pentoxide upon being heated to an elevated temperature, (b) shaping, (c) drying and (d) calcining. The amount of phosphorus oxide which should be present varies and, in general, a satisfactory amount is in the range of from about 0.1 to 10, preferably 1 to 5, parts per 100 parts of alumina, the parts being by weight. For practical purposes, the alumina must have at least a substantial (0.3 cc/g) pore volume in order that it have a useful capacity for the metal impurity removed from the oil. Suitable pore volumes are in the range of from about 0.3 to 1.1 cc/g, of which at least 50% is desirably in pores having diameters in the 60 to 250 Angstrom range. Because of the high molecular weights of the feed components and in order to avoid and/or minimize diffusion limitation problems, the alumina should also have at least an appreciable (3% of pore volume) content of pores having diameters in the range above 1000 Angstroms (macropores) as determined by the mercury porosimetry method.

In addition to alumina and phosphorus oxide, the oil demetallizing material herein may contain, based upon the alumina, up to about 20 weight percent of the other refractory metal oxides conventionally used in the preparation of reasonably inert hydrocarbon processing catalyst carriers, for example, such as silica, magnesia, and the like. Methods for preparing alumina suitable for use herein are known in the art, for example, in U.S. Pat. Nos. 4,102,822 (P. W. Tamm); 4,066,574 (B. F. Mulasky); 4,019,978 (A. W. Miller et al); and 3,879,310 (R. J. Rigge et al).

EXAMPLE

This example further illustrates certain aspects, but not the scope, of the invention.

The conditions for obtaining an accelerated determination of the metals capacity of a hydrocarbon demetallizing material include (1) a temperature (initial temperature about 382° C. and final about 438° C.) sufficient to produce a 100° C.+ boiling product having a sulfur content of 0.5 weight percent; (2) a system pressure of about 177 atmospheres gauge; (3) a hydrogen rate, SCM per cubic meter of feed, of 178; and (4) a liquid hourly space velocity of 2.2. Using these conditions and a Gach Saran Iranium residuum feed, alumina contact materials with and without added phosphorus were tested for their metals capacity over a run length of about 350 hours. The unmodified alumina contact material contained little or no deposited vanadium and nickel components. On the other hand, the phosphorus-modified alumina (about 1.5 weight percent phosphorus calculated as phosphorus and applied using aqueous phosphoric acid by impregnation) contained a substantial amount of nickel and vanadium components. This deposit was comparable to that produced using a conventional hydrocarbon hydrodemetallizing catalyst, such as a molybdenum-alumina composite under comparable conditions.

What is claimed is:

1. In a process for upgrading an oil selected from the group consisting of petroleum and syncrude oils, fractions and mixtures thereof containing at least a substantial content of at least one metal impurity selected from the group consisting of metal impurities indigenous to said oils, by contact thereof under oil demetallizing conditions with a solid consisting esentially of alumina containing an oxide promoter, the improvement comprising (1) carrying out said contact with an alumina having a pore volume of at least 0.3 cc per gram and said oxide promoter being phosphorus oxide in the range of from about 0.1 to 10 parts; calculated as phosphorus, for each 100 parts of alumina in parts by weight.

2. A process as in claim 1 wherein at least 50% of said pore volume is in macropores having diameters in the 60 to 250 Angstrom range and an amount in the range 5 to 10% of said pore volume is in macropores having diameters above about 1000 Angstroms.

3. A process as in claim 1 wherein said solid contains about 1 weight percent of phosphorus.

4. A process as in claim 1 wherein said conditions include a temperature of about 400° C., a hydrogen rate, SCM per kiloliter, of about 200, a pressure of about 170 atmospheres gauge, and a space velocity, V/V/Hr, of about 1.

* * * * *